United States Patent Office 2,855,699
Patented Oct. 14, 1958

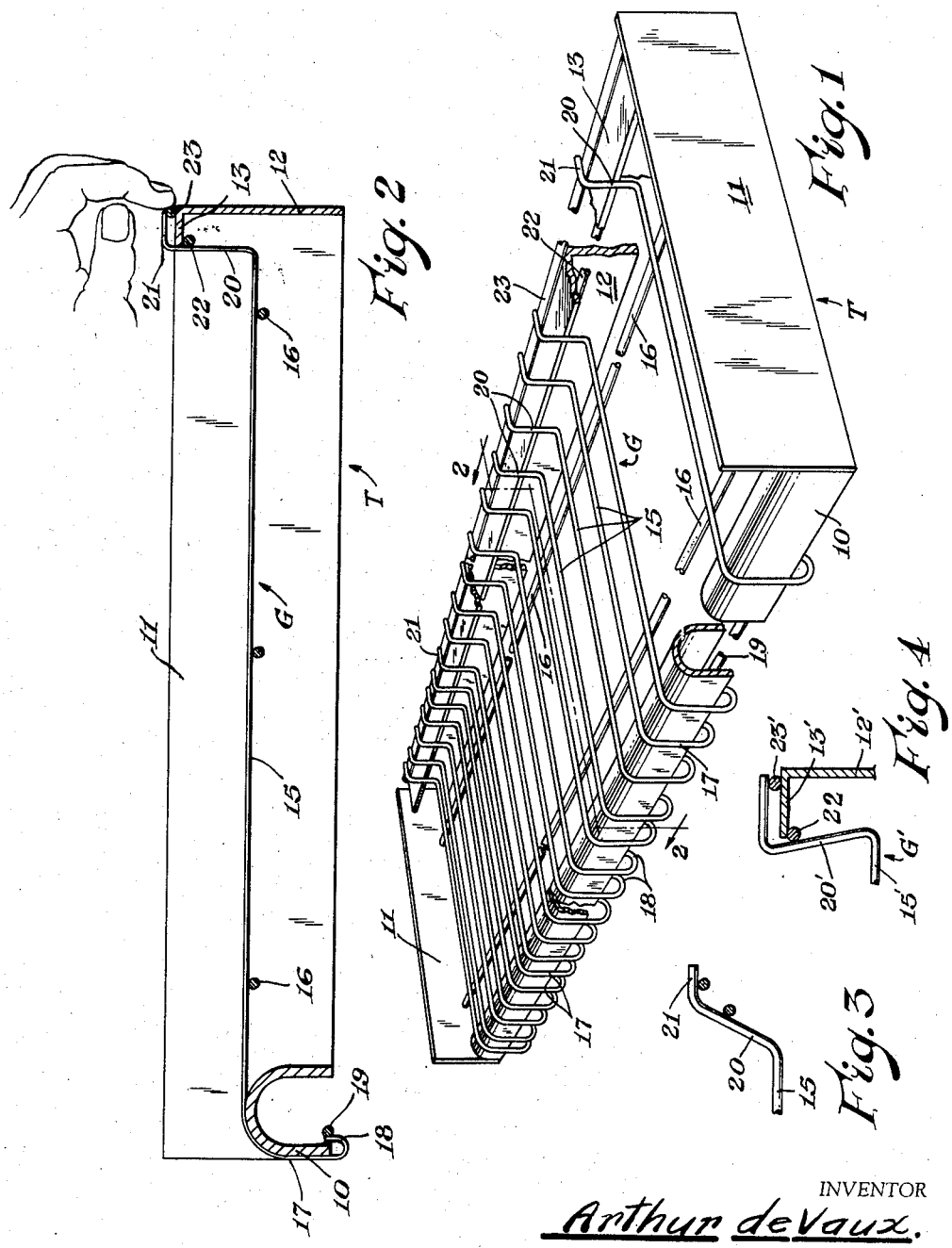

2,855,699

TRAY GRID FOR CONTROLLED TRAY COOLER

Arthur De Vaux, Saginaw, Mich., assignor to Baker Perkins, Inc., Saginaw, Mich.

Application July 21, 1954, Serial No. 444,791

7 Claims. (Cl. 34—238)

This invention relates to new and useful improvements in trays for use in bread cooling apparatus and the like to support such baked goods as loaves of bread.

Trays of the type to which I have reference are generally mounted on tracks in a cooler and are adapted to receive bread loaves or other baked products from oven unloading apparatus and to transport them through a defined path of travel in a controlled atmosphere to a point remote from the oven whence they are discharged in a relatively cooled state to a wrapping machine or other handling device. Trays of this type in general use today have been provided with removable grid sections; however, the installation and removal of these sections for purposes of cleaning and the like has been relatively tedious and time-consuming.

One of the prime objects of the invention is to design a tray with a grid which can be very easily and rapidly removed in individual sections when necessary for cleaning or repair purposes, and thence as easily reinstalled without the use of any tools whatever.

A further object of the invention is to provide a tray which promotes sanitary practice in that the bread supporting surfaces thereof need not be handled in the installation and removal of the grid, and the frame and grid are so designed that crumbs, dust and other particulate matter will not tend to collect thereon.

Another object of the invention is to provide such a tray with readily disengageable bread supporting grid sections which have a minimum contact with the hot bread loaves so that relatively little moisture is permitted to condense on the grid portions contacting the bread and the undersurface of the bread does not become soggy.

Still another object of the invention is to design a tray frame with a grid which can be easily installed from the rear side thereof as well as from the front thereof.

A further object of the invention is to design a tray with a grid which is resiliently maintained in position and cannot shift or be inadvertently displaced once it is mounted on the tray.

Another object of the invention is to design a tray with a grid which can be very easily loaded and unloaded by mechanical pusher bar means or the like.

A further object of the invention is to design a tray with a grid of strong and rigid construction which permits maximum circulation of air around the bread loaves.

Another object of the invention is to provide a tray of the type described in which spaced cross rods spanning the front and rear members of the tray frame are not required for securing the grid sections in position.

A still further object of the invention is to design a tray which is light in weight, durable, thoroughly practical in construction, and comprises relatively few component parts of simple nature which can be very economically manufactured and assembled.

With the above and other objects in view, the present invention consists in the combination and arrangement of parts, hereinafter more fully described, illustrated in the accompanying drawings, and pointed out in the appended claims, it being understood that equivalent changes may be made in the various elements of the invention, without departing from the spirit of the invention, or sacrificing any of the advantages thereof.

In the drawings:

Fig. 1 is a perspective view of the tray frame with grid sections resiliently supported in position thereon.

Fig. 2 is a transverse, sectional view taken on the line 2—2 of Fig. 1.

Fig. 3 is a fragmentary, elevational view of the rear end of a grid section which has been removed from the tray frame, illustrating the normal position of the upturned portions of the rods.

Fig. 4 is a similar sectional view illustrating a modification of the invention.

Referring now more particularly to the accompanying drawings, a letter T generally indicates my tray frame which includes a front rail member 10 connected by end members 11 to a rear or back frame member 12. These members 10 and 12 may be referred to as longitudinally disposed, transversely spaced side members. For the sake of convenience, I shall describe the tray as supporting loaves of bread; however, it is to be understood that the apparatus described or adaptations thereof may be employed to support and transport other products. The member 10 is substantially U-shaped in cross-section as shown and is employed in inverted position so that crumbs will not collect thereon. It will be observed that the end members 11 and rear frame member 12 extend above the front member 10, the latter member 12 being L-shaped in cross-section to increase the rigidity of the structure and being employed in inverted position with the flange or rib 13 thereof turned inwardly. Rollers (not shown) are provided on the outer faces of the end members 11 and guide on tracks (not shown) to facilitate movement of the tray in a rearward direction.

A sectional grid G which can be very readily installed and removed from either side of the tray is provided on the tray frame F. The grid sections are comprised of a plurality of transversely disposed, resilient, relatively small gauge, wire rods 15 arranged in longitudinally spaced, parallel relation and connected by longitudinally disposed rods 16 of relatively heavier gauge. Since the rods 16 are welded or otherwise suitably fixed to the undersides of the rods 15, it will be apparent that the bread loaves on the grid will be supported above the rods 16 and will engage only the wire members 15 of relatively small gauge so that there is a minimum surface on which moisture which might contact the bread can collect.

The front ends of the wire rods 15 are turned downwardly as at 17, and are thence hooked upwardly as at 18, the terminal ends thereof being joined by rod sections 19 which, when the grid sections are mounted in position on the tray frame T, are disposed within the front rail 10. The rear ends of the wire rods 15 are turned upwardly as at 20 and thence laterally rearwardly as at 21. Preventing upward displacement of the grid sections when the latter are installed in position are rods 22 joining portions 20, and supporting the laterally turned portions 21 above the flange surface 13 are rods 23 which are fixed to the terminal ends thereof.

The hot bread loaves are preferably loaded onto the grid sections G from the front of the tray by a pusher bar (not shown) and when they have completed their journey through the cooler are similarly discharged from the front of the tray by an unloading pusher bar (not shown) moving forwardly from a rest position at the rear of the tray. For this reason, the height of the member 12 of the tray and portions 20 of the wire rods 15 is limited so that the bread loaves will extend sufficiently above the portions 21 of the rods 15 to permit their engagement by the unloading pusher bar.

To remove one of the grid sections from the front side of the tray, it is merely necessary to reach across to grasp a rod 23 (see Fig. 2) and pull the same in a forward direction until the rod 22 clears the flange 13. The grid section may then be lifted upwardly, swung forwardly, and removed, portions 18 of the rods 15 and rod 19 dropping out of the member 10. The grid section is similarly replaced by first hooking the rod 19 and portions 18 up under the front edge of the member 10, and thence swinging the section rearwardly and engaging the rod 22 under the flange 13 once again. In order to engage the rod 22 under the flange 13, the portions 20 of the resilient rods 15 are of course flexed inwardly or forwardly. It will be apparent that the normal position (see Fig. 3) of the portions 20 is outward of the position in which they appear in installed position in Fig. 2 so that the portions 20 of the rods will bear against the flange 13 and prevent longitudinal shifting of the grid sections when the latter are mounted on the tray frame F.

In Fig. 4, I have shown another embodiment of the invention wherein the horizontal portions of the rods 15' are of slightly greater length than in the first embodiment described and extend in under the flange 13'. In this modification, the portions 20' of the rods may be vertical in normal position when the grid sections are removed from the tray, but are of course flexed inwardly and bear against the flange 13' when in installed position. Rods 21' and 23' are provided as before and the installation and removal of these grid sections G' is identical.

The grid sections G and G' are easily removed and reinstalled from the rear side of the tray in the same manner, except that the grid sections may be disengaged from the flange 13 or 13' by a sharp blow with the heel of the hand.

Since the upper surface of the front member 10 of the tray is of curved configuration, crumbs and the like will not collect thereon in the loading and unloading of the tray. While I have shown the loaf-supporting portions of the rods 15 in horizontal position, it will be apparent that these portions could be somewhat inclined as desired.

From the foregoing, it should be apparent that I have perfected a very practical tray which may be employed to good advantage in other apparatus where products are to be cooled, stored, dried or the like. It is to be understood that the descriptive matter and drawings are always to be interpreted as illustrative of the invention rather than limiting the scope or application thereof and for a determination of the actual scope of the invention, attention is directed to the appended claims.

What I claim is:

1. In combination with a tray frame having longitudinally disposed, transversely spaced side members and transversely disposed members connecting said side members, a grid comprising longitudinally spaced, resilient rods with certain ends thereof secured against one of said side members and the opposite ends thereof turned upwardly adjacent the opposite side member, the length of said rods being such that the normal position of sections of said upturned portions of said rods is outward of the adjacent side member when the grid is placed on the frame to span the side members and the said certain ends are in position against said one of said side members, the said upturned portions being flexible inwardly to install the same on the tray frame so that when released they bear on the said adjacent side member and resiliently maintain the grid in position, and means connecting said rods.

2. The combination defined in claim 1 in which the upper surface of the side member on which the said certain ends of the rods are secured is generally arcuate in configuration.

3. The combination defined in claim 1 in which the side member adjacent which said upwardly turned portions of the rods are disposed includes an inwardly directed flange, and a rod connecting the outer surfaces of said upturned portions of the rods is disposed under said flange when the grid is in position on said tray frame.

4. The combination defined in claim 1 in which the side member on which the said certain ends of the rods are secured is substantially tubular with the underside thereof open, the said certain ends of the rods being turned downwardly over the said side member and having reversely turned terminal ends received within said side member.

5. In a tray, a frame comprising side members connected by transverse members, one of said side members having an inwardly directed flange, a grid supported by said side members, said grid comprising a plurality of spaced, resilient rods spanning said side members, said rods being formed with upwardly turned end sections adjacent said side member having the flange, the upwardly turned portions having rod means connecting the same, engaged immediately under said flange and engaging therewith to hold the said upwardly turned portions in position and prevent their displacement in an upward direction, and the opposite ends of said rods including portions secured against the opposite side member, the rods being of such length from the portions secured against the opposite side member that their upturned end sections must be sprung inwardly to dispose the upwardly turned end sections inward of the flange and the rod means under said flange.

6. In a tray, a frame comprising spaced-apart front and rear members, the rear member extending above said front member and having an inwardly extending flange, the front member being generally U-shaped in cross section and disposed in inverted position, end members connecting said front and rear members, a grid supported on said frame, said grid comprising a plurality of parallelly disposed, spaced-apart, resilient rods substantially spanning said front and rear members, said rods having rear ends turned upwardly substantially parallel to the said rear member of the tray and thence turned outwardly over said flange thereof, and front ends turned downwardly over said front member of the frame and thence reversely to hook under the front member, the span of said rods between said downwardly and upwardly turned ends thereof being slightly greater than the spaced distance between the outer surface of said front member and flange of the rear member so that the grid must be flexed forwardly to install it on the tray frame and will be resiliently maintained in position, a cross rod joining the outer surfaces of the upturned rear ends of said rods disposed under the said flange of the rear member and bearing thereagainst when the grid is resiliently supported in position, and a cross rod joining the under-surfaces of the outwardly turned portions of the rear ends of said rods to support the same above the said flange.

7. In a tray, a frame comprising front and rear members connected by end members, said rear member having an inwardly projecting rib thereon, a grid substantially spanning said front and rear members, said grid including a plurality of rods extending substantially from said front members to said rear member, the front ends being secured against said front member in a manner to prevent their outward movement relative thereto and the rear ends being turned upwardly adjacent the said rib, the span of said rods between the points of securement of said front ends against said front member and the upturned rear ends being slightly greater than the spaced distance between said points of securement of the front ends against said front member and a front portion of the rear member so that the upturned portions of said rods are in normal position outward of said rib when the front ends of said rods are secured and said grid is in substantially horizontal position, the rear ends of said rods being flexible inwardly when the grid is installed in position so that when released they will bear against the said rib and resiliently maintain the grid in position, and means outwardly of the rear ends of said rods in engagement with the rib to prevent upward displacement of the grid.

References Cited in the file of this patent
UNITED STATES PATENTS 2,677,198     Doll et al. _____ May 4, 1954